US008799089B1

United States Patent
Gonzalez Loyo

(10) Patent No.: US 8,799,089 B1
(45) Date of Patent: Aug. 5, 2014

(54) VIRTUAL PAYMENT SYSTEM FOR THE PHYSICAL WORLD

(76) Inventor: German Efrain Gonzalez Loyo, Weston, FL (US)

( * ) Notice: Subject to any disclaimer, the term of this patent is extended or adjusted under 35 U.S.C. 154(b) by 0 days.

(21) Appl. No.: 13/216,333

(22) Filed: Aug. 24, 2011

(51) Int. Cl.
*G06Q 30/06* (2012.01)
(52) U.S. Cl.
USPC ............... 705/21; 705/51; 705/39; 705/44; 705/26.41; 709/203
(58) Field of Classification Search
USPC ............. 705/16, 43, 35, 39, 26, 42, 348, 44; 709/203
See application file for complete search history.

(56) References Cited

U.S. PATENT DOCUMENTS

| | | | |
|---|---|---|---|
| 6,845,364 B1* | 1/2005 | Pool et al. ................. | 705/26.35 |
| 7,702,578 B2* | 4/2010 | Fung et al. ................. | 705/39 |
| 8,280,776 B2* | 10/2012 | Coulter et al. .............. | 705/16 |
| 2003/0004978 A1* | 1/2003 | Greenbaum ................ | 707/202 |
| 2007/0265945 A1* | 11/2007 | Schimpf et al. ............ | 705/35 |
| 2009/0182630 A1* | 7/2009 | Otto et al. .................. | 705/14 |
| 2010/0211469 A1* | 8/2010 | Salmon et al. ............. | 705/16 |
| 2010/0332334 A1* | 12/2010 | Kilfoil ....................... | 705/16 |
| 2011/0246362 A1* | 10/2011 | O'Leary et al. ............ | 705/41 |
| 2012/0066041 A1* | 3/2012 | Mankoff .................... | 705/14.17 |

* cited by examiner

*Primary Examiner* — Vanel Frenel
(74) *Attorney, Agent, or Firm* — Albert Bordas, P.A.

(57) ABSTRACT

A virtual payment system that bridges virtual payments for transactions occurring in the physical world, whereby bridges includes a virtual payment system network communicating information to at least one telephone number or e-mail address to enable a recipient to authorize payment via an alternative payment entity for at least one good or service selected by a customer at a merchant.

2 Claims, 3 Drawing Sheets

A customer identifies payment type at a point of purchase at merchant 50. The customer chooses to pay at the point of sale, POS, or web pay page with instant invention 10. The customer provides a cashier or web pay page with a payer's mobile telephone number.

Merchant 50, or any third party vendor utilizing instant invention 10 with virtual payment system network 20 software, provides virtual payment system network 20 information J that includes but is not limited to: a merchant 50 identification mobile internet device, ID (MID); transaction amount; transaction type; and the payer's mobile telephone number.

Virtual payment system network 20 generates as information J: a transaction identification, which is linked internally to the requesting ID (MID) and requesting virtual payment system network 20 user (merchant 50, cashier of merchant 50 / web pay page); and a formal payment request to a respective mobile telephone of payer's mobile telephone number, identifying requesting merchant 50, cashier of merchant 50 / web pay page; purchase amount; and transaction identification.

Payer then authenticates and authorizes K information J and pushes form of payment to alternative payment entity 80.

Alternative payment entity 80 sends payment approval / denial L to virtual payment system network 20. Virtual payment system network 20 matches payment with pending transaction ID waiting in queue and forwards the request to requesting merchant 50, cashier of merchant 50 / web pay page for transaction completion. Alternative payment entity 80 notifies payer's mobile device asynchronously as a notification.

Fig. 3

VIRTUAL PAYMENT SYSTEM FOR THE PHYSICAL WORLD

BACKGROUND OF THE INVENTION

1. Field of the Invention

The present invention relates to payment methods for goods and services, and more particularly, to a virtual payment system for the physical world and its method of use.

2. Description of the Related Art

In the physical world, a customer wanting to purchase goods or services typically visits a merchant's place of business in person. Upon selection of desired good(s) and/or service(s), the customer pays the merchant. Customary forms of payment include cash, checks, credit cards, debit cards, charge cards, prepaid cards, and direct debit. In the physical world, payment must be transmitted in person to complete a purchase transaction for the desired goods and/or services.

In the virtual world, a customer wanting to purchase goods or services typically visits a merchant's website through the Internet utilizing a computer. Upon selection of desired good(s) and/or service(s), the customer pays the merchant. Customary forms of payment in the virtual world include alternative payments, credit cards, debit cards, charge cards, prepaid cards, and direct debit. In the virtual world, payment is transmitted via the Internet to complete a purchase transaction for the desired goods and/or services.

Applicant is not aware of a virtual payment system for the physical world comprising the novel features of the present invention.

SUMMARY OF THE INVENTION

The instant invention is a virtual payment system for the physical world, whereby it bridges virtual payments for transactions occurring in the physical world.

It is therefore one of the main objects of the present invention to provide a virtual payment system for the physical world.

It is another object of this invention to provide a virtual payment system for the physical world than enables a customer to purchase desired goods and/or services utilizing a virtual payment system network.

It is another object of this invention to provide a virtual payment system for the physical world than enables a recipient to authenticate and authorize payment for desired goods and/or services utilizing a virtual payment system network.

It is another object of this invention to provide a virtual payment system for the physical world than enables a complete purchase transaction for desired goods and/or services utilizing a virtual payment system network.

It is yet another object of this invention to implement such a system that is inexpensive to operate and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 3 is a flowchart defining particular method steps of the virtual payment system that bridges virtual payments for transactions occurring in a physical world.

DETAILED DESCRIPTION OF THE PREFERRED EMBODIMENT

Figure 1:
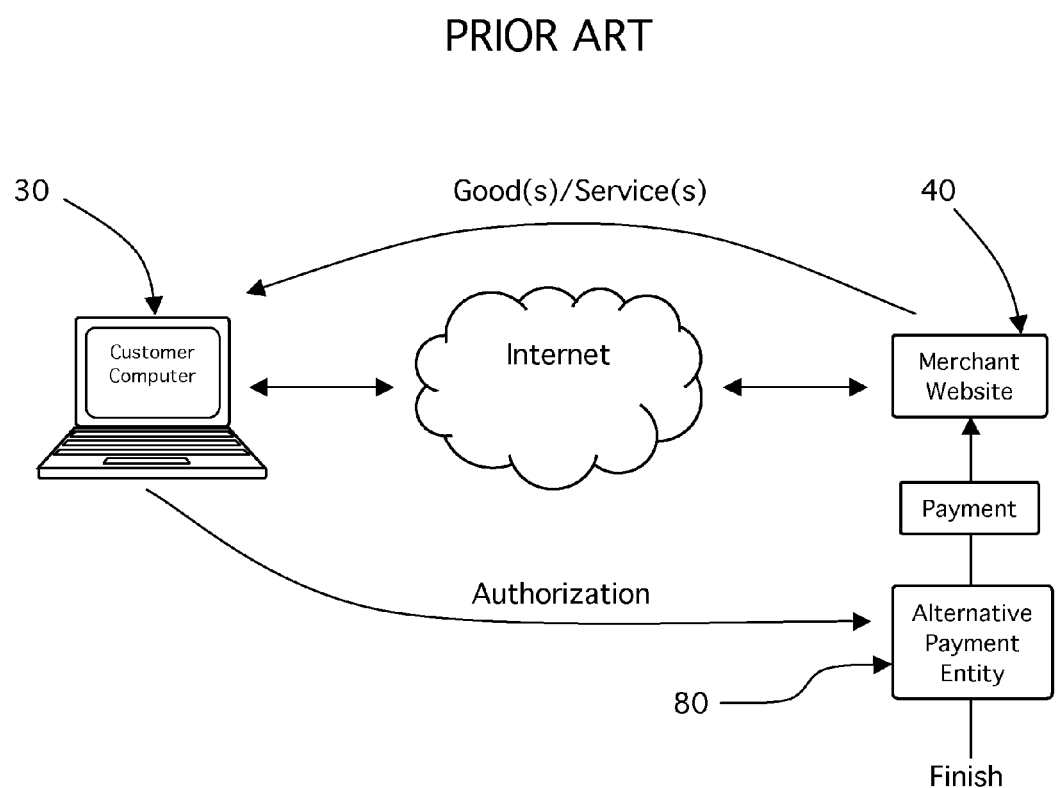
FIG. 1 is a prior art illustration of purchasing good(s) and/or service(s) via an alternative payment entity.

Referring now to the drawings, the present invention is generally referred to with numeral 10. It can be observed that it basically includes at least one virtual payment system network 20, at least one merchant 50, and at least one alternative payment entity 80.

As seen in FIG. 1, presently in the virtual world, a customer wanting to purchase goods or services typically visits a merchant's website 40 through via the Internet, defined as a global computer network, utilizing computer 30. Upon selection of desired good(s) and/or service(s), the customer pays for them. A customary form of payment in the virtual world is by alternative payment, whereby payment is transmitted by an authorization via the Internet to alternative payment entity 80 to complete a purchase transaction for the desired goods and/or services. Upon authorization, alternative payment entity 80 makes payment to the merchant and the merchant sends the desired good(s) and/or service(s) to the customer.

Figure 2:
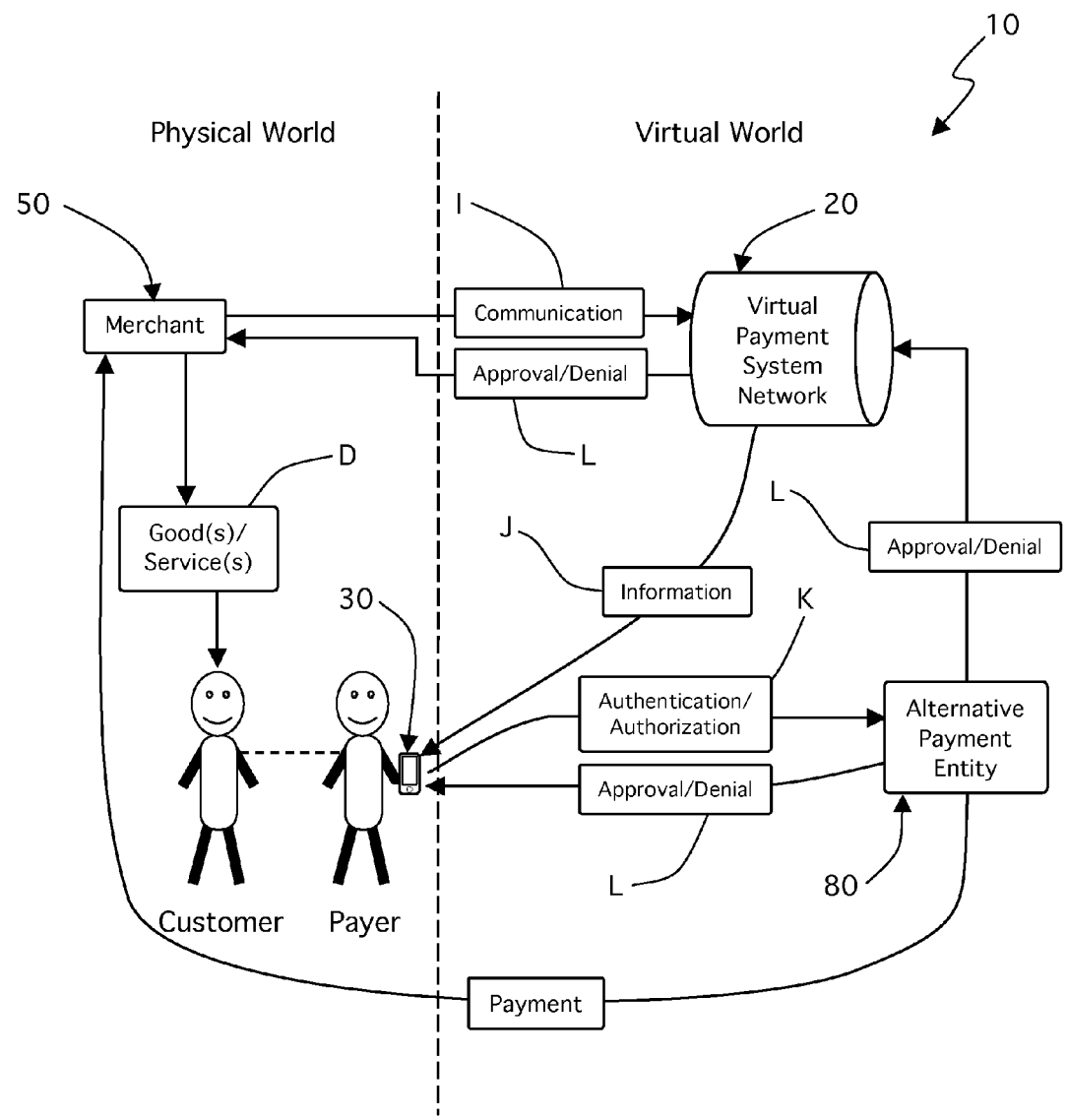
FIG. 2 is an illustration of purchasing good(s) and/or service(s) with the virtual payment system for the physical world, object of the present invention.

As seen in FIG. 2, present invention 10 is a virtual payment system for the physical world, whereby it bridges virtual payments for transactions occurring in the physical world.

Virtual payments are made by alternative payment entity 80. Alternative payment entity 80 is specifically developed for electronic commerce and its respective payment systems are generally supported and operated by banks. Each alternative payment entity 80 has its respective alternative payment methods, which have their own unique applications, settlement processes, language, currency support, and are subject to domestic rules and regulations. Alternative payment entity 80 is capable of implementing and/or administering and managing alternative payments.

More specifically, alternative payment entity 80 may perform the following services:

clear and reconcile financial transactions via the Internet;

provide a wide variety of banking services and provide financial services, namely, credit card services, processing and transmission of bills and payments thereof, and insurance for financial transactions conducted via global computer network;

provide and/or utilize computer software for processing electronic payments to and from others that may be downloaded from the Internet and/or recorded on computer media;

provide and/or utilize authentication software that may be downloaded from the Internet and/or recorded on computer media;

provide and/or utilize computer software for processing electronic payments and transferring funds to and from others;

provide and/or utilize authentication software for controlling access to and communications with computers that may be downloaded from the Internet and/or recorded on computer media;

provide and/or utilize magnetically encoded credit cards and payment cards;

provide and/or utilize computer hardware security device, namely, a non-predictable code calculator for accessing a host database computer;

provide financial services, namely, electronic funds transfer via electronic communications networks;

clear and reconcile financial transactions via electronic communications networks;

provide a wide variety of payment and financial services, namely, credit card services, issuing credit cards and lines of credit, processing and transmission of bills and payments thereof, bill payment services with guaranteed payment delivery, and brokerage of money market funds, all conducted via the Internet;

provide dispute resolution services; and provide financial fraud protection and prevention.

As an example, one such alternative payment entity 80 is PayPal, Inc., whereby PayPal, Inc. is an e-commerce business allowing payments and money transfers to be made through the Internet. Online money transfers serve as electronic alternatives to traditional paper methods such as cheques and money orders. A "PAYPAL" account can be funded with an electronic debit from a bank account or by a credit card. The recipient of a "PAYPAL" transfer can either request a cheque from "PAYPAL", establish their own "PAYPAL" deposit account or request a transfer to their bank account. "PAYPAL" performs payment processing for online vendors, auction sites, and other commercial users, for which it charges a fee. It may also charge a fee for receiving money, proportional to the amount received. The fees depend on the currency used, the payment option used, the country of the sender, the country of the recipient, the amount sent and the recipient's account type. In addition, "EBAY" purchases made by credit card through "PAYPAL" may incur extra fees if the buyer and seller use different currencies.

Another such alternative payment entity 80 is "GOOGLE CHECKOUT". "GOOGLE CHECKOUT" is an online payment processing service provided by Google, Inc. aimed at simplifying the process of paying for online purchases. Users store their credit or debit card and shipping information in their "GOOGLE ACCOUNT", so that they can purchase at participating stores by clicking an on-screen button. "GOOGLE CHECKOUT" provides fraud protection and a unified page for tracking purchases and their status.

Another such alternative payment entity 80 is "BILL ME LATER". "BILL ME LATER" is a payment method offered on the websites of many well-known merchants provided by I4 Commerce Inc. The well-known merchants include those of Wal-Mart, USPS, Best Buy, Overstock.com, American Airlines, JetBlue Airways, Jewelry Television and Hotels.com. A "BILL ME LATER" site, which offers credit through CIT Bank, allows purchases to be made online without using a credit card.

Another such alternative payment entity 80 is "AMAZON PAYMENTS" provided by Amazon.com, Inc. is "AMAZON PAYMENTS" is a way for customers to purchase goods and services at websites across the internet using the payment methods in their Amazon.com accounts, such as their Visa or MasterCard. (Currently Amazon.com and Amazon Payments will not accept payment methods such as "PAYPAL" or "GOOGLE CHECKOUT"). At participating vendors, which include Patagonia and Jockey, users can check out using their Amazon account information without needing to re-enter credit card numbers or shipping addresses. Users can also check out with Amazon's 1 Click.

As seen in FIG. 2, a customer wanting to purchase at least one good(s)/service(s) D visits merchant 50. The customer selects desired at least one good(s)/service(s) D and presents it to merchant 50 for purchase. Merchant 50 obtains relevant information from the at least one good(s)/service(s) D. Merchant 50 requests the method of payment from the customer and the customer responds with the virtual payment system for the physical world method of payment to merchant 50. Merchant 50 then requests a telephone number and/or e-mail address of the customer. Merchant 50 communicates I the relevant information from the desired at least one good(s)/service(s) D, and the telephone number or e-mail address obtained from the customer to virtual payment system network 20. Virtual payment system network 20 receives the relevant information J of the desired at least one good(s)/service(s) D, and the telephone number or e-mail address obtained from the customer and sends the relevant information J. The recipient of the relevant information J from virtual payment system network 20 will be a person having a telephone/cell phone/smart phone/or similar communications device or a computer capable of receiving e-mail communications such as telephone or computer 30. For purposes of instant invention 10, the recipient will also be defined as a payer. If the recipient approves of the purchase by the customer of the desired at least one good(s)/service(s) D, he/she will authenticate K information J for purchase and will authorize K payment with alternative payment entity 80. Upon receiving a successful authorization for payment, alternative payment entity 80 notifies virtual payment system network 20 and merchant 50, and the recipient of payment approval or denial L. The notification may be asynchronously. Upon receiving a payment approval, merchant 50 releases the desired at least one good(s)/service(s) D to the customer completing the transaction. Merchant 50 is then paid.

Therefore, instant invention 10 is a virtual payment system that bridges virtual payments for transactions occurring in a physical world, comprising communications means to enable a recipient of information J to authorize payment via alternative payment entity 80 on behalf of a customer, whereby the communications means is a telephone or computer 30. Merchant 50 sends information J to virtual payment system network 20. Virtual payment system network 20 sends information J to the recipient. Alternative payment entity 80 approves or denies L the payment to merchant 50 for good(s)/service(s) D of the customer. Alternative payment entity 80 coordinates the payment to merchant 50 for good(s)/service(s) D of the customer.

More specifically, instant invention 10 is a virtual payment system that bridges virtual payments for transactions occurring in a physical world, comprising communications means to enable a recipient of information J to authorize K payment via alternative payment entity 80 on behalf of a customer, whereby communications means is telephone or computer 30.

Business relationships are established between at least one merchant such as merchant 50, and at least one virtual payment system network such as virtual payment system network 20 and at least one alternative payment entity such as alternative payment entity 80. A customer visits merchant 50, selects at least one good(s)/service(s) D and obtains information therefrom. The information comprises information of good(s)/service(s) D such as, but not limited to, information that may be contained in a bar code; good or product detail; product number; serial number; cost; or any other information pertinent or relevant to describe/define good(s)/service(s) D. A method of payment is requested from the customer. The method of payment is communicated to merchant 50. A telephone number or e-mail address is requested from the customer.

Information J is communicated to virtual payment system network 20, whereby merchant 50 sends communication I of information J to virtual payment system network 20. Information J may comprise some or all of the information defined above, and specifically: information of good(s)/service(s) D, the method of payment, and the telephone number or e-mail address.

Virtual payment system network 20 sends information J to the recipient, whereby information J is sent to the telephone number or e-mail address by virtual payment system network 20. The telephone number or e-mail address is of telephone or computer 30. Information J is authenticated K for purchase by the recipient and used to authorize K the payment via alternative payment entity 80.

Alternative payment entity 80 approves or denies L the payment to merchant 50 for good(s)/service(s) D of the customer. Alternative payment entity 80 notifies the recipient and virtual payment system network 20 of the payment approval or denial L. Virtual payment system network 20 notifies merchant 50 of the payment approval or denial L. With payment approval, alternative payment entity 80 coordinates the payment to merchant 50 for good(s)/service(s) D of the customer.

It is noted that the customer and the recipient/payer may be two different individuals, or may be one and the same.

Seen in FIG. 3 is a flowchart defining particular method steps of virtual payment system that bridges virtual payments for transactions occurring in a physical world 10, whereby a customer identifies payment type at a point of purchase at merchant 50. The customer chooses to pay at the point of sale, POS, or web pay page with instant invention 10. The customer provides a cashier or web pay page with a payer's mobile telephone number.

Merchant 50, or any third party vendor utilizing instant invention 10 with virtual payment system network 20 software, provides virtual payment system network 20 information J that includes but is not limited to:

a merchant 50 identification mobile Internet device, ID (MID);
transaction amount;
transaction type; and
the payer's mobile telephone number.

Virtual payment system network 20 generates as information J: a transaction identification, which is linked internally to the requesting ID (MID) and requesting virtual payment system network 20 user (merchant 50, cashier of merchant 50/web pay page); and a formal payment request to a respective mobile telephone of payer's mobile telephone number, identifying requesting merchant 50, cashier of merchant 50/web pay page; purchase amount; and transaction identification.

Payer then authenticates and authorizes K information J and pushes form of payment to alternative payment entity 80.

Alternative payment entity 80 sends payment approval/denial L to virtual payment system network 20. Virtual payment system network 20 matches payment with pending transaction ID waiting in queue and forwards the request to requesting merchant 50, cashier of merchant 50/web pay page for transaction completion. Alternative payment entity 80 notifies payer's mobile device asynchronously as a notification.

Therefore, a virtual payment system that bridges virtual payments for transactions occurring in a physical world comprises the steps of:

A) identifying a payment type at a point of purchase of a merchant by a customer;
B) choosing to pay at a point of sale or web pay page;
C) providing a cashier or said web pay page with a payer's mobile telephone number;
D) providing information by said merchant, or any third party vendor utilizing a virtual payment system network software to a virtual payment system network, comprising:
a merchant identification mobile Internet device, ID (MID);
a transaction amount;
a transaction type; and
said payer's mobile telephone number;
E) generating by said virtual payment system network a transaction identification, which is linked internally to requesting said ID (MID) and requesting virtual payment system network user, and a formal payment request to a respective mobile telephone of said payer's mobile telephone number, identifying requesting said merchant, cashier of said merchant, or said web pay page; said transaction amount; and said transaction identification;
F) authenticating and authorizing said transaction identification and pushing said payment type to an alternative payment entity;
G) sending an approval or denial by said alternative payment entity to said virtual payment system network, said virtual payment system network matches payment with pending said transaction identification waiting in queue and forwards to requesting said merchant, said cashier of merchant, or said web pay page for transaction completion;
H) notifying asynchronously said payer's mobile device number by said alternative payment entity.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A virtual payment system that bridges virtual payments for transactions occurring in a physical world, comprising communications means to enable a recipient of information to authorize payment via an alternative payment entity on behalf of a customer, said communications means is a telephone or computer, and further characterized in that business relationships are established between a merchant, and a virtual payment system network and said alternative payment entity, whereby said customer visits said merchant, selects at least one good(s)/service(s) and obtains said information, further characterized in that a method of said payment is requested from said customer, said method of said payment is communicated to said merchant, further characterized in that a telephone number or e-mail address is requested from said customer, said merchant sends said information to said virtual payment system network, said information is communicated to said virtual payment system network, said virtual payment system network sends said information to said recipient whereby said information is sent to said telephone number or e-mail address by said virtual payment system network, said information is authenticated for purchase and used to authorize said payment via said alternative payment entity, said alternative payment entity approves or denies said payment to said merchant for said at least one good(s)/service(s) of said customer, said alternative payment entity notifies said recipient and said virtual payment system network notifies said merchant of said payment approval or denial, and said alternative payment entity coordinates said payment to said merchant for said at least one good(s)/service(s) of said customer.

2. A virtual payment system that bridges virtual payments for transactions occurring in a physical world consisting of the steps:

A) identifying a payment type at a point of purchase of a merchant by a customer;
B) choosing to pay at a point of sale or web pay page;
C) providing a cashier or said web pay page with a payer's mobile telephone number;
D) providing information by said merchant, or any third party vendor utilizing a virtual payment system network software to a virtual payment system network, comprising:
a merchant identification mobile Internet device, ID (MID);
a transaction amount;
a transaction type; and
said payer's mobile telephone number;
E) generating by said virtual payment system network a transaction identification, which is linked internally to requesting said ID (MID) and requesting virtual payment system network user, and a formal payment request to a respective mobile telephone of said payer's mobile telephone number, identifying requesting said merchant, cashier of said merchant, or said web pay page; said transaction amount; and said transaction identification;
F) authenticating and authorizing said transaction identification and pushing said payment type to an alternative payment entity;
G) sending an approval or denial by said alternative payment entity to said virtual payment system network, said virtual payment system network matches payment with pending said transaction identification waiting in queue and forwards to requesting said merchant, said cashier of said merchant, or said web pay page for transaction completion; and
H) notifying asynchronously said payer's mobile device number by said alternative payment entity.

* * * * *